United States Patent
Zhang

(10) Patent No.: US 7,386,357 B2
(45) Date of Patent: Jun. 10, 2008

(54) SYSTEM AND METHOD FOR GENERATING AN AUDIO THUMBNAIL OF AN AUDIO TRACK

(75) Inventor: Tong Zhang, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1095 days.

(21) Appl. No.: 10/259,572

(22) Filed: Sep. 30, 2002

(65) Prior Publication Data
US 2004/0064209 A1    Apr. 1, 2004

(51) Int. Cl.
G06F 17/00 (2006.01)

(52) U.S. Cl. ......................................... 700/94; 704/500

(58) Field of Classification Search .................. 84/616, 84/654, 681; 704/255, 500; 369/4; 700/94
See application file for complete search history.

(56) References Cited

U.S. PATENT DOCUMENTS

| | | | |
|---|---|---|---|
| 4,792,934 A | 12/1988 | Masaki | |
| 5,048,390 A | 9/1991 | Adachi et al. | |
| 5,105,401 A | 4/1992 | Aoyagi et al. | |
| 5,126,987 A | 6/1992 | Shiba et al. | |
| 5,408,449 A | 4/1995 | Oh | |
| 5,664,227 A | 9/1997 | Mauldin et al. | |
| 6,009,438 A | 12/1999 | Kawasaki et al. | |
| 6,044,047 A | 3/2000 | Kulas | |
| 6,128,255 A | 10/2000 | Yankowski | |
| 6,225,546 B1* | 5/2001 | Kraft et al. ............... | 84/609 |
| 6,247,130 B1 | 6/2001 | Fritsch | |
| 6,332,145 B1 | 12/2001 | Kawasaki et al. | |
| 6,369,822 B1* | 4/2002 | Peevers et al. ........... | 345/473 |
| 6,424,793 B1 | 7/2002 | Setogawa et al. | |
| 6,452,598 B1* | 9/2002 | Rafey et al. ............... | 345/473 |
| 6,633,845 B1* | 10/2003 | Logan et al. .............. | 704/255 |
| 6,807,450 B1 | 10/2004 | Takenaka et al. | |
| 7,065,416 B2* | 6/2006 | Weare et al. .............. | 700/94 |
| 2001/0003813 A1* | 6/2001 | Sugano et al. ............ | 704/500 |

(Continued)

FOREIGN PATENT DOCUMENTS

EP    0367191    5/1990

(Continued)

OTHER PUBLICATIONS

Zhang et al, "Audio Content Analysis for Online Audiovisual Data Segmentation and Classification," in IEEE Trans. on Speech and Audio Processing vol. 9, No. 4, May 2001.*

(Continued)

Primary Examiner—Sinh Tran
Assistant Examiner—Walter F Briney, III

(57) ABSTRACT

A method and system for generating an audio thumbnail of an audio track in which a first content feature, such as singing, is detected as a characteristic of an audio track. A predetermined length of the detected portion of the audio track corresponding to the first content feature is extracted from the audio track. A highlight of the audio track, such as a portion of the audio track having a sudden increase in temporal energy within the audio track, is detected; and a portion of the audio track corresponding to the highlight is extracted from the audio track. The two extracted portions of the audio track are combined as a thumbnail of the audio track.

17 Claims, 10 Drawing Sheets

U.S. PATENT DOCUMENTS

| | | | |
|---|---|---|---|
| 2002/0120752 | A1 | 8/2002 | Logan et al. |
| 2003/0037664 | A1 | 2/2003 | Comair et al. |
| 2003/0049591 | A1* | 3/2003 | Fechter .................. 434/307 A |
| 2003/0083871 | A1* | 5/2003 | Foote et al. ................ 704/233 |
| 2003/0125964 | A1* | 7/2003 | Chang et al. ................... 705/1 |
| 2004/0027369 | A1* | 2/2004 | Kellock et al. ............. 345/716 |

FOREIGN PATENT DOCUMENTS

| | | |
|---|---|---|
| WO | WO00/52914 | 9/2000 |
| WO | WO01/69575 | 9/2001 |

OTHER PUBLICATIONS

Mark A. Bartsch and Gregory H. Wakefield, "To Catch a Chorus: Using Chroma-Based Representations for Audio Thumbnailing," Proceedings of IEEE Workshop on Applications of Signal Processing to Audio and Acoustics, pp. 15-18, New York, Oct. 2001.

Hsuan-Huei Shih, et al., "Comparison of Dictionary-Based Approaches to Automatic Repeating Melody Extraction," Proceedings of SPIE: Storage and Retrieval for Media Databases, vol. 4767, pp. 306-317, San Jose, Jan. 2002.

Adam L. Berenzweig and Daniel P. W. Ellis, "Locating Singing Voice Segments Within Music Signals," Proceedings of IEEE Workshop on Applications of Signal Processing to Audio and Acoustics, pp. 119-122, New York, Oct. 2001.

Wu Chou and Liang Gu, "Robust Singing Detection in Speech/Music Discriminator Design," Proceedings of the IEEE International Conference on Acoustics, Speech and Signal Processing, pp. 865-868, 2001.

Eric Scheirer and Malcolm Slaney, "Construction and Evaluation of a Robust Multifeature Speech/Music Discriminator," Proceedings of the IEEE International Conference on Acoustics, Speech and Signal Processing, pp. 1331-1334,1997.

Lawrence R. Rabiner and Ronald W. Schafer, Digital Processing of Speech Signals, 120-131, (Prentice-Hall 1978).

* cited by examiner

SYSTEM AND METHOD FOR GENERATING AN AUDIO THUMBNAIL OF AN AUDIO TRACK

BACKGROUND OF THE INVENTION

1. Field of the Invention

The present invention relates to previewing collections of songs and, more specifically, to systems and methods for generating thumbnails and highlights from an audio track.

2. Background Information

The number and size of multimedia databases and collections, whether personal or commercial, have grown rapidly in recent years with the advent of compact disks (hereinafter "CD's"), MP3 disks, affordable personal computer systems, the Internet, and online media sharing websites. Being able to efficiently browse these files and to quickly discern their content is an important aid to users who desire to make listening and/or purchasing decisions from a database or collection of many separate audiovisual works.

Song owners may wish to listen to a particular song but cannot remember the title and/or the artist. For an owner with hundreds of songs, finding a particular song may require listening to all or portions of dozens of songs before the desired song is found. While some CD players have a feature whereby a listener can listen to the first ten or twenty seconds of a song, the beginning of a song may be an instrumental prelude that is not representative of the content or lyrics of the song. One system that permits a potential purchaser to listen to a short clip of music is disclosed in U.S. Pat. No. 6,247,130 to Fritsch, entitled "Distribution of Musical Products by a Web Site Vendor Over the Internet," the contents of which are incorporated herein by reference. Alternatively, a potential purchaser of a song album or CD listens to entire songs on the collection before being able to preview a particular song or songs of interest in order to make a buying decision.

One technique whereby users can browse a collection of soundtracks and songs is to create and catalog short samples of each audio track and/or song in the collection. One approach to the creation of an audio sample is through the identification of a repeated portion of the song, such as a chorus or a refrain. Such a method is described in Mark A. Bartsch and Gregory H. Wakefield, "To Catch a Chorus: Using Chroma-Based Representations for Audio Thumbnailing," *Proceedings Of IEEE Workshop on Applications of Signal Processing to Audio and Acoustics*, pp 15-18, New York, October 2001, the contents of which are incorporated herein by reference. Another technique for indexing and retrieving songs by finding repeating patterns in the songs is through a dictionary-based approach, as described in Hsuan-Huei Shih, et al., "Comparison of Dictionary-Based Approaches to Automatic Repeating Melody Extraction," *Proceedings of SPIE: Storage and Retrieval for Media Databases*, vol 4767, pp 306-317, San Jose, January 2002, the contents of which are incorporated herein by reference.

Yet another method by which a song is summarized for purposes of indexing and subsequent recognition and retrieval is by transcription of the lyrics of the song. The indexing system distinguishes between the voice and instrumental portions of the audio track, a method for which is described in Adam L. Berenzweig and Daniel P. W. Ellis, "Locating Singing Voice Segments Within Music Signals," *Proceedings of IEEE Workshop on Applications of Signal Processing to Audio and Acoustics*, pp 119-122, New York, October 2001, the contents of which are incorporated herein by reference.

SUMMARY OF THE INVENTION

Exemplary embodiments of the invention are directed to a method and system for generating an audio thumbnail of an audio track, including detecting a first content feature within an audio track; extracting a first portion of the audio track corresponding to the detected first content feature; detecting an occurrence of an increase in energy within the audio track; extracting a second portion of the audio track corresponding to the detected increase in energy; and combining the extracted first and second portions of the audio track into an audio thumbnail of the audio track.

Embodiments are also directed to a method for generating an audio thumbnail of an audio track, including detecting a first characteristic within an audio track; mapping a pointer to the detected first characteristic within the audio track; setting a first duration of time; detecting an occurrence of an increase in energy within the audio track; mapping a pointer to the detected occurrence of an increase in energy within the audio track; setting a second duration of time; and storing the pointer to the detected first characteristic, the first duration of time, the pointer to the detected occurrence of an increase in energy, and the second duration of time as an audio thumbnail of the audio track.

Another exemplary embodiment is directed to a method for detecting highlights on an audio track, including determining a location of human sound on an audio track; computing a first temporal energy envelope of a first segment of the audio track; computing a second temporal energy envelope of a second segment of the audio track; comparing the computed first and second temporal energy envelopes; and if the second segment corresponds to a location of human sound on the audio track and if the computed temporal energy of the second segment exceeds the computed temporal energy of the first segment by a predetermined threshold, selecting a location on the audio track corresponding to the location of the second segment as a highlight on the audio track.

Alternative embodiments provide a computer-based system for generating a thumbnail of an audio track, including a recorder configured to record an audio track comprised of singing and instrumental music; and a processor configured to detect a first content feature within an audio track; extract a first portion of the audio track corresponding to the detected first content feature; detect an occurrence of an increase in energy within the audio track; extract a second portion of the audio track corresponding to the detected increase in energy; and combine the extracted first and second portions of the audio track into an audio thumbnail of the audio track.

An additional embodiment is also directed to a computer readable medium encoded with software for generating an audio thumbnail of an audio track, by detecting a first content feature within an audio track; extracting a first portion of the audio track corresponding to the detected first content feature; detecting an occurrence of an increase in energy within the audio track; extracting a second portion of the audio track corresponding to the detected increase in energy; and combining the extracted first and second portions of the audio track into an audio thumbnail of the audio track.

BRIEF DESCRIPTION OF THE DRAWINGS

These and other objects and advantages of the present invention will become more apparent and more readily appreciated to those skilled in the art upon reading the following description of the preferred embodiments, taken in conjunction with the accompanying drawings, wherein.

DETAILED DESCRIPTION OF THE PREFERRED EMBODIMENTS

Figure 1:
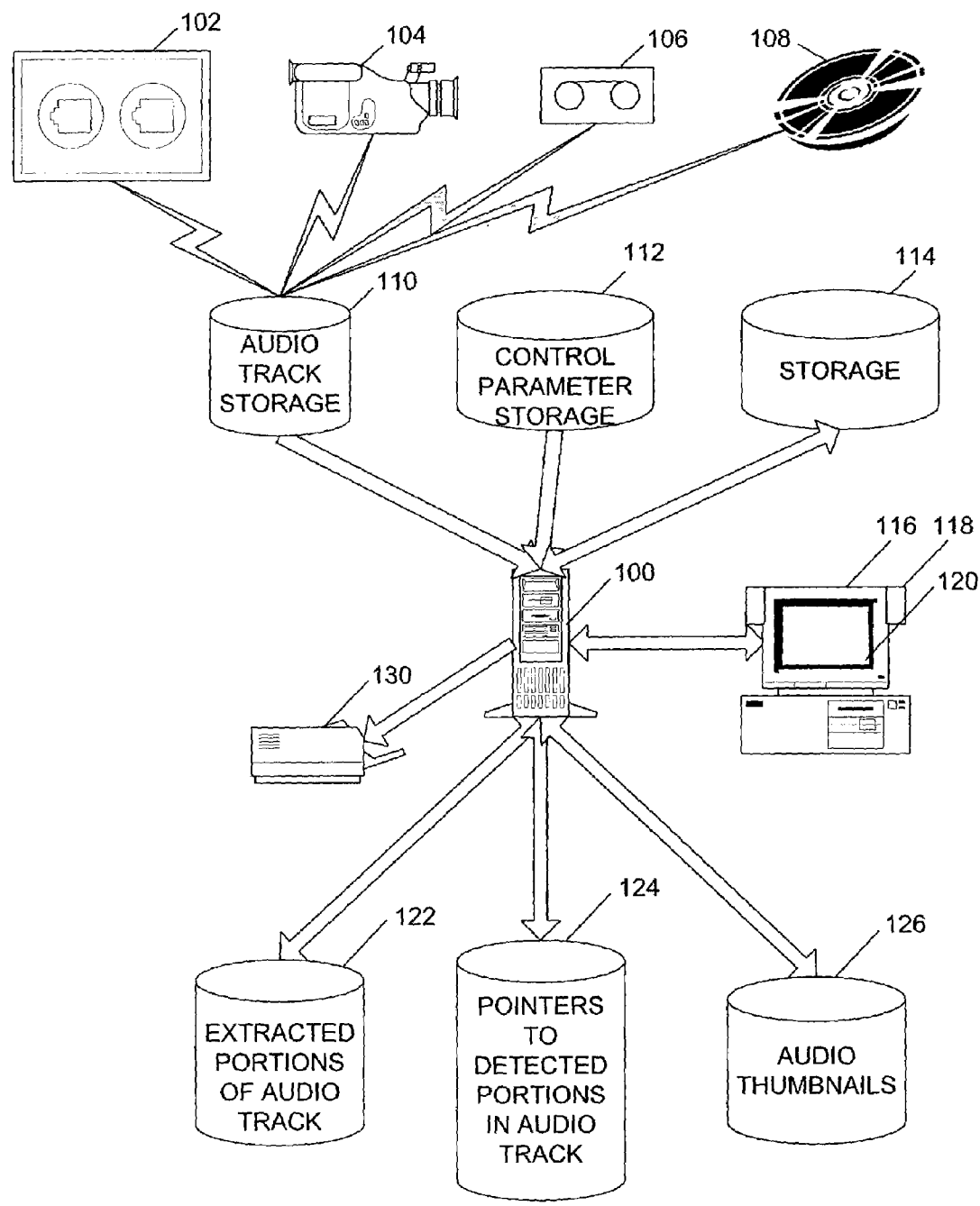
FIG. 1 shows a component diagram of a system for generating a thumbnail of an audio track in accordance with an exemplary embodiment of the invention.

FIG. 1 illustrates a computer-based system for generating audio thumbnails of audio tracks including songs and instrumental music according to an exemplary embodiment of the invention. The term, "thumbnail," as used herein is intended to refer to a brief excerpt or sample of a song, multimedia file, or audiovisual signal track that is representative of the song, file, or track and can be reviewed to assist in identification of the content of the song or file. In particular, FIG. 1 shows a recording device such as a tape recorder 102 configured to record an audio track. Alternatively, any number of recording devices, such as a video camera 104, can be used to capture an electronic track of sounds, including singing and instrumental music. The resultant recorded audio track can be stored on such media as cassette tapes 106 and/or CD's 108. For the convenience of processing the audio tracks by embodiments of the invention, the audio tracks can also be stored in a memory or on a storage device 110 to be subsequently processed by a computer 100 comprising one or more processors. Further, exemplary embodiments are compatible with various networks, including the Internet, whereby the audio tracks can be downloaded for processing on the computer 100 and the resultant output audio thumbnails can be uploaded across the network for subsequent storage and/or browsing by a user who is situated remotely from the computer 100.

The one or more audio tracks are input to a processor in a computer 100 according to exemplary embodiments. The processor in the computer 100 can be a single processor or can be multiple processors, such as first, second, and third processors, each processor adapted by software or instructions of exemplary embodiments to detect a first characteristic within an audio track; to extract a first portion of the audio track corresponding to the detected first characteristic; to detect an occurrence of an increase in energy within the audio track; to extract a second portion of the audio track corresponding to the detected increase in energy; and to combine the extracted first and second portions of the audio track into an audio thumbnail of the audio track. The multiple processors can be integrated within the computer 100 or can be configured in separate computers which are not shown in FIG. 1. The computer 100 can include a computer-readable medium encoded with software or instructions for controlling and directing processing on the computer 100 for generating an audio thumbnail of an audio track.

The computer 100 can include a display, graphical user interface, personal computer 116 or the like for controlling the processing, for viewing the results on a monitor 120, and/or listening to the thumbnail over the speakers 118. An audio track is input to the computer 100 from a live presentation of a song or other musical event as captured by one or more recorders 102, cameras 104, or the like and/or from a prior recording of the song stored on a medium such as a tape 106 or CD 108. While FIG. 1 shows the audio tracks from the recorder 102, the camera 104, the tape 106, and the CD 108 being stored on an audio track storage medium 110 prior to being input to the computer 100 for processing, the audio tracks can also be input to the computer 100 directly from any of these devices without detracting from the features of exemplary embodiments. Embodiments can also be implemented within the recorder 102 or camera 104 themselves so that the audio thumbnails can be generated concurrently with, or shortly after, the song or musical event being recorded.

Figure 7:
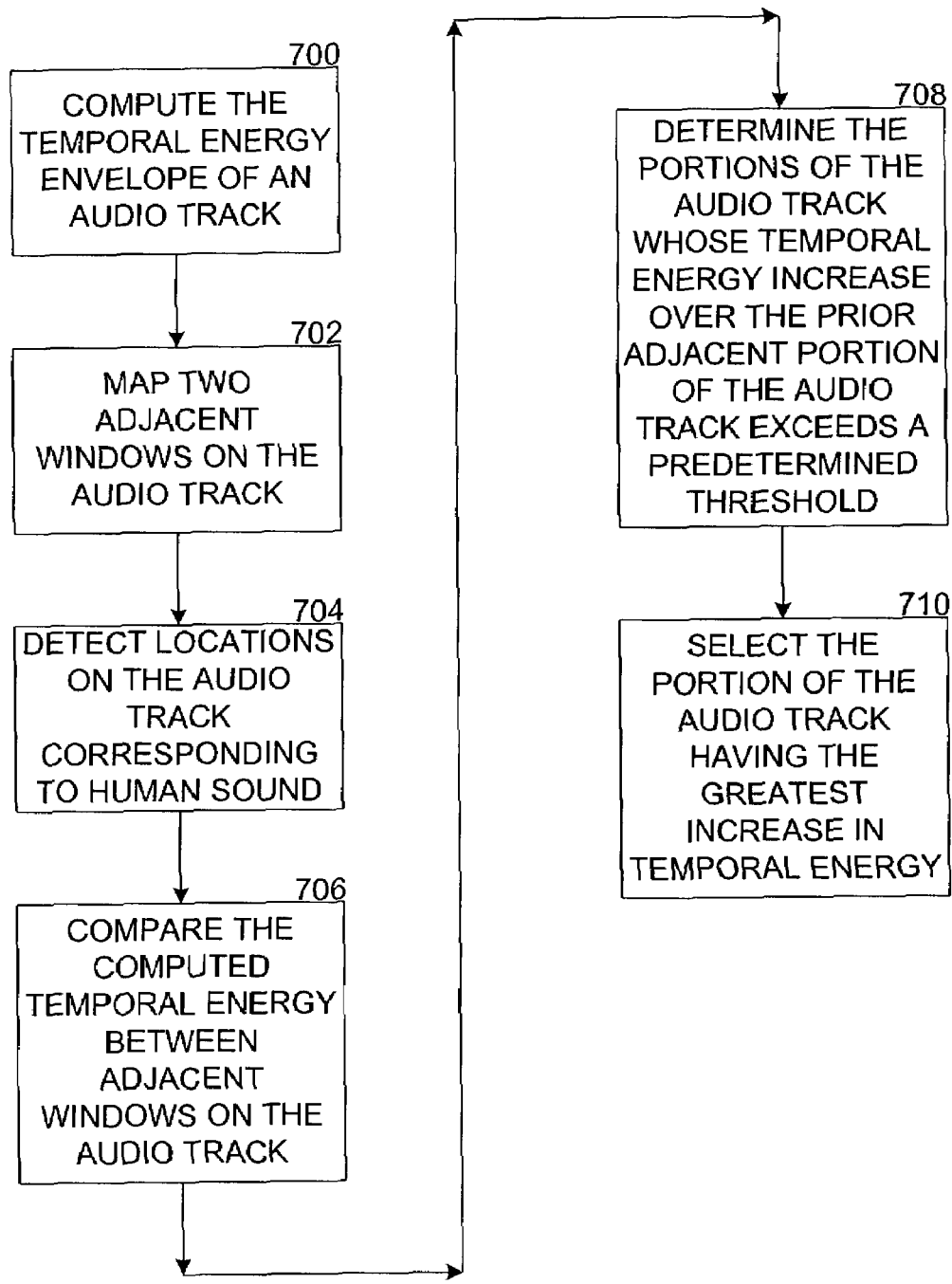
FIG. 7 shows a block flow chart of an exemplary method for detecting a highlight on an audio track.

The computer 100 accepts as parameters one or more variables for controlling the processing of exemplary embodiments. For example, an audio thumbnail can be generated having two portions extracted from an audio track, and length parameters controlling the size of each of the two audio track portions can be selected from control parameter storage 112 by a user by means of the computer or graphical user interface 116. While these control parameters are shown as residing on storage device 112, this control information can also reside in memory of the computer 100 or in alternative storage media without detracting from the features of exemplary embodiments. As will be explained in more detail below regarding the processing steps shown in FIGS. 2, 7, and 10, exemplary embodiments utilize selected and default control parameters to detect and extract human sound and highlight audio portions from the audio track and to store the extracted audio portions on one or more storage devices 122 and 126. In an alternative embodiment, pointers to the detected characteristics and features within the audio tracks are mapped to the detected locations on the audio track, and the pointer information is stored on a storage device 124 along with corresponding lengths for the detected audio tracks. The processor operating under control of exemplary embodiments further outputs audio thumbnails for storage on storage device 126. Additionally, the results of the thumbnail generation process can be output to a printer 130.

While exemplary embodiments of the invention are directed toward systems and methods for generating thumbnails of songs, instrumental music, and combinations thereof, embodiments can also be applied to any audio track or signal for generating a thumbnail or an audio summary of the track that can be used to catalog, index, preview, and/or identify the content of the audio information and signals on the track. For example, a collection or database of songs can be indexed by creating an audio thumbnail representative of each song. In such an application an audio track of a song, which can be recorded on a CD for example, can be input to the computer 100 for generation of audio thumbnail. A user who is subsequently searching for a particular song to play or to purchase, for example, can listen to the thumbnail of the song to identify whether the indexed song is the one sought after or desired to be purchased. While the discussion of exemplary embodiments will discuss the audio tracks as being electronic forms of songs, with the songs comprised of human sounds, such as voices and/or singing, and instrumental music, the audio tracks can be any form of multimedia data, including audiovisual works, as long as the tracks include audio data. Exemplary embodiments can generate audio thumbnails of audio tracks of any type of human voice, whether it is spoken, sung, or comprised of non-speech sounds. In such a manner, exemplary embodiments are not limited by the audio content of the audio tracks and can generate thumbnails that can be used to index and preview various audio recordings and representations. Songs as discussed herein include all or a portion of an audio track, wherein an audio track is understood to be any form of medium or electronic representation for conveying, transmitting, and/or storing a musical composition. For purposes of explanation and not limitation, audio tracks also include tracks on a CD 108, tracks on a tape cassette 106, tracks on a storage device 112, and the transmission of music in electronic form from one device, such as a recorder 102, to another device, such as the computer 100.

Figure 2:
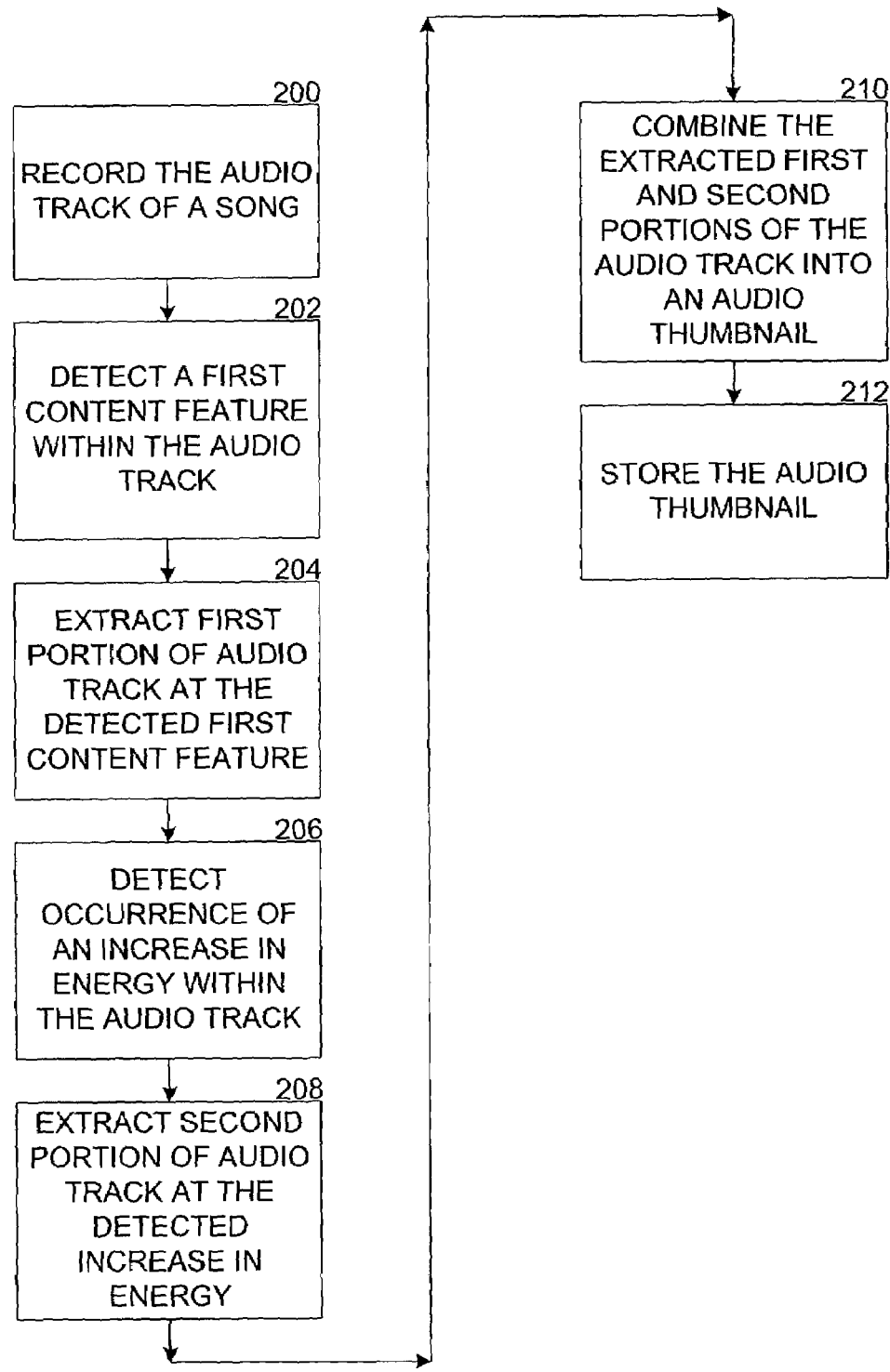
FIG. 2 shows a block flow chart of an exemplary method for generating a thumbnail of an audio track.
Figure 3:
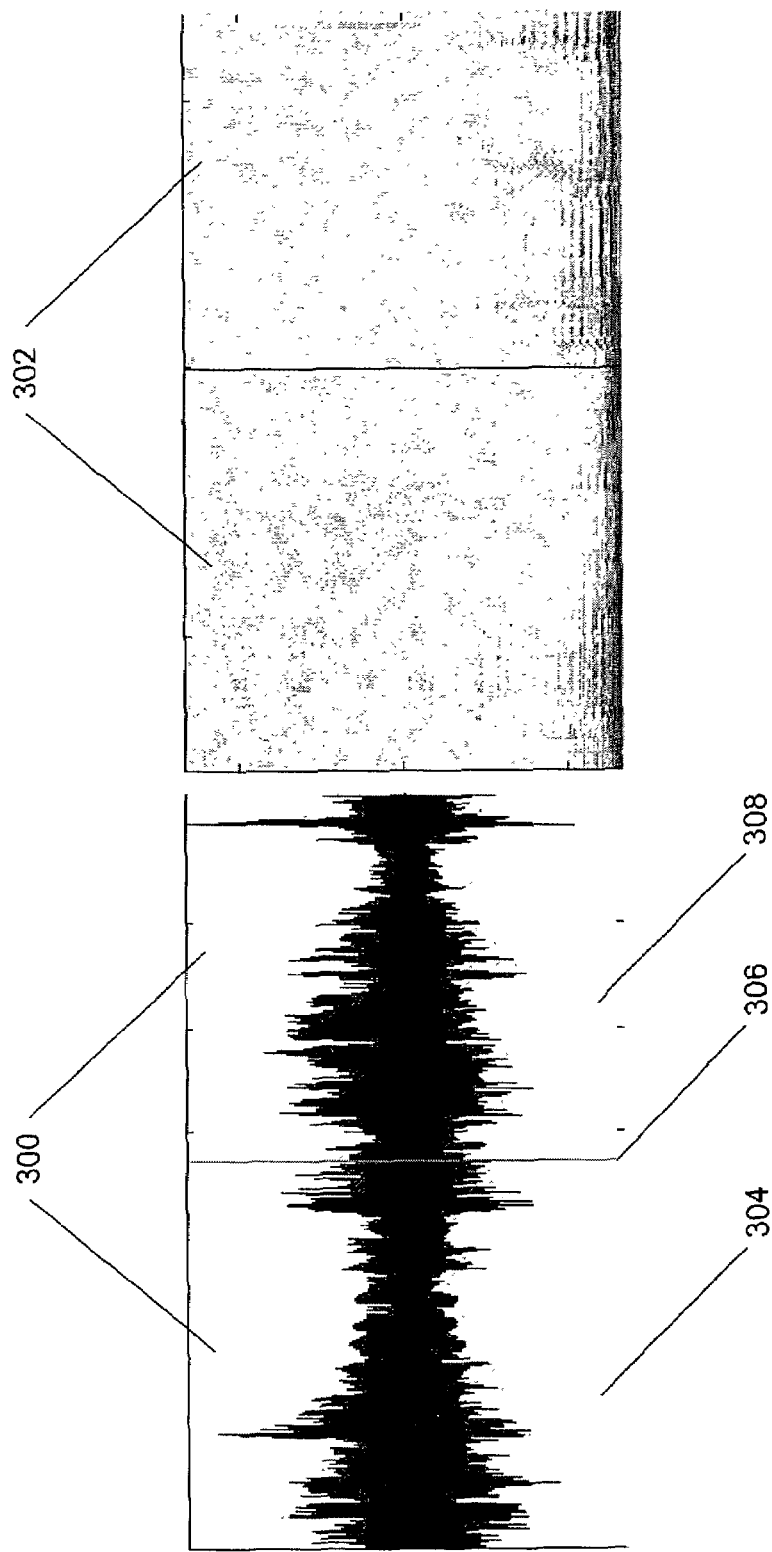
FIG. 3 shows a waveform and a corresponding spectrograph of an exemplary audio track.

Referring now to FIGS. 1, 2, and 3, a description of an exemplary embodiment of a system for generating an audio thumbnail of an audio track will be presented. FIG. 2 shows a method for generating an audio thumbnail of an audio track, beginning at step 200 with the recording of an audio track of a song or a musical event, such as a play or a concert. FIG. 3 shows a waveform 300 of an audio track, with the vertical axis representing the amplitude of the audio signals and the horizontal axis showing the signal across time. The corresponding spectrograph of the audio track is shown at 302, with the vertical axis denoting frequency of the audio signal and the horizontal axis denoting time. In the figure, the beginning interlude of the audio track is shown in box 304, while the dotted line 306 denotes the start of singing voice (shown in box 308) following the interlude.

The media upon which the audio track is recorded can be any known analog or digital media and can include transmission of the audio signals from the site of the event to the site of the audio track storage 110 and/or the computer 100. At step 202, exemplary embodiments of the thumbnail generation system search for and detect an occurrence of a first content feature or characteristic existing within the audio track. While songs can begin with an instrumental prelude, as shown as 304 in FIG. 3, such preludes may not be unique enough to characterize the song or musical piece. Therefore, exemplary embodiments can search for a first occurrence of a human sound, such as singing, on the audio track. The singing can be by a solo artists or by multiple artists, such as a singing group or a choir. By selecting one or more parameters from control parameter storage 112, the user can control whether the exemplary embodiments search for singing, speech, or a particular human sound or sounds, at step 202. Exemplary audio clips are stored on storage 114 and can be utilized by embodiments to compare against sounds and signals within the audio track for finding a match to a particular artist or human sound, for example.

Exemplary embodiments can utilize one or more voice detection methods or algorithms in step 202 to distinguish the start of a human voice on the audio track. These methods can take advantage of special features that distinguish the human voice from other types of sound and include short-time average zero crossing rate, harmonic coefficient, spectral flux, filter analysis, and short-time energy functions, each of which will be briefly discussed herein.

In the context of discrete-time signals, a zero-crossing is said to occur if successive audio samples have different signs. The rate at which zero-crossings occur can be one measure of the frequency content of a signal. The short-time average zero-crossing rate (ZCR) is defined as $$Z_n = \frac{1}{2} \sum_m |sgn[x(m)] - sgn[x(m-1)]| w(n-m) \quad (1)$$

where $$sgn[x(m)] = \begin{cases} 1 & x(m) \geq 0 \\ -1 & x(m) < 0 \end{cases}$$

and $$w(m) = \begin{cases} 1 & 0 \leq m \leq N-1 \\ 0 & \text{otherwise} \end{cases}$$

N is length of the window on the audio track. By assuming that the audio signal changes relatively slowly within a small interval, $Z_n$ is normally computed every 10-20 ms. For example, supposing that the sampling rate of an audio signal is 16000 Hz, $Z_n$ can be computed approximately every 200 audio samples. The audio track window length is usually set to be larger than this interval so that there can be an overlap between neighboring audio frames. For example, if $Z_n$ is computed every 200 samples, the audio track window length can be set to 250 samples.

Figure 4:
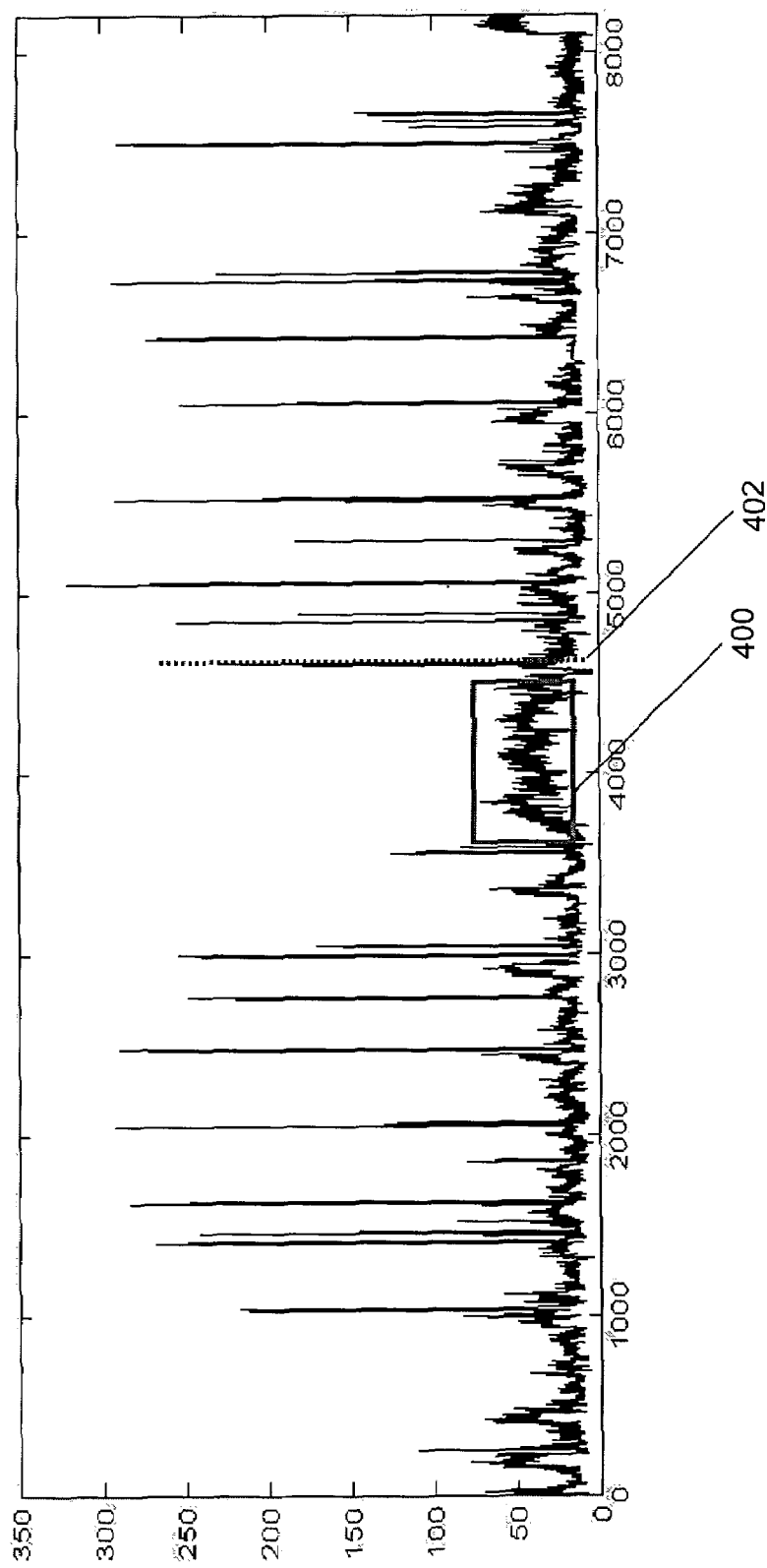
FIG. 4 shows the waveform of short-time average zero-crossing rates of an audio track.

While ZCR values of instrumental music are normally within a small range, a singing voice is generally indicated by high amplitude ZCR peaks, due to unvoiced components (e.g. consonants) in the singing signal. Therefore, by analyzing the variances of the ZCR values for an audio track, the beginning of human voice on the audio track can be detected. One example of application of the ZCR method is illustrated in FIG. 4, wherein the waveform of short-time average zero-crossing rates of a song is shown, with the y-axis representing the amplitude of the ZCR rates and the x-axis showing the signal across time. In the figure, the box 400 indicates an interlude period of the audio track, while the line 402 denotes the start of singing voice following the interlude., at which point the relative increase in ZCR value variances can be seen.

The harmonic coefficient of an audio signal is a weighted combination of temporal and spectral autocorrelation coefficients which can provide a good indication of existing harmonic components in the audio signal. A discussion of harmonic coefficient can be found at Wu Chou and Liang Gu, "Robust Singing Detection in Speech/Music Discriminator Design," *Proceedings of the IEEE International Conference on Acoustics, Speech and Signal Processing*, pp 865-868, 2001, the contents of which are incorporated herein by reference. The harmonic coefficient is defined as follows: given an audio signal x(m), the temporal autocorrelation for candidate pitch τ is defined as $$R^T(\tau) = \frac{\sum_{m=0}^{N-\tau-1} [\tilde{x}(m) \cdot \tilde{x}(m+\tau)]}{\sqrt{\sum_{m=0}^{N-\tau-1} \tilde{x}^2(m) \cdot \sum_{m=0}^{N-\tau-1} \tilde{x}^2(m+\tau)}}$$

where $\tilde{x}(m)$ is the zero-mean version of x(m), and N is the number of samples for feature analysis. The spectral autocorrelation is defined as:

$$R^S(\tau) = \frac{\int_0^{\pi-w_\tau} \tilde{X}(\omega)\tilde{X}(\omega+\omega_\tau)d\omega}{\sqrt{\int_0^{\pi-\omega_\tau}\tilde{X}^2(\omega)d\omega \int_0^{\pi-\omega_\tau}\tilde{X}^2(\omega+\omega_\tau)d\omega}}$$ (5)

where $\omega_\tau = 2\pi/\tau$, $X(\omega)$ is the magnitude spectrum of $x(m)$, and $\tilde{X}(\omega)$ is the zero-mean version of $X(\omega)$. Then, the spectral-temporal autocorrelation is defined as:

$$R(\tau) = \beta \cdot R^T(\tau) + (1-\beta) \cdot R^S(\tau)$$

where $\beta$ can be any value between 0 and 1 (for example, $\beta$ can be chosen to be 0.5). By combining $R^T(\tau)$ and $R^S(\tau)$, using $R(\tau)$ achieves better robustness than using $R^T(\tau)$ or $R^S(\tau)$ alone. The harmonic coefficient $H_n$ is defined as:

$$H_n = \max_\tau R(\tau)$$ (2)

For example, $H_n$ can be computed every 15 ms, over a window of 20 ms of sample audio data. Singing voices can have strong harmonic components, and thus have higher values of harmonic coefficients than instrumental music; thereby permitting detection of human voices over instrumental music.

Spectral flux is the 2-norm of the frame-to-frame spectral amplitude difference vector. This method is discussed in Eric Scheirer and Malcolm Slaney, "Construction and Evaluation of a Robust Multifeature Speech/Music Discriminator," *Proceedings of the IEEE International Conference on Acoustics, Speech and Signal Processing*, pp 1331-1334, 1997, the contents of which are incorporated herein by reference. For example, if $x_n(m)$ is presumed to be the nth frame of the audio signal, and $X_n(\omega)$ is the magnitude spectrum of $x_n(m)$, the spectral flux is defined as:

$$F_n = \||X_n(\omega)| - |X_{n+1}(\omega)|\|$$ (3)

Figure 5:
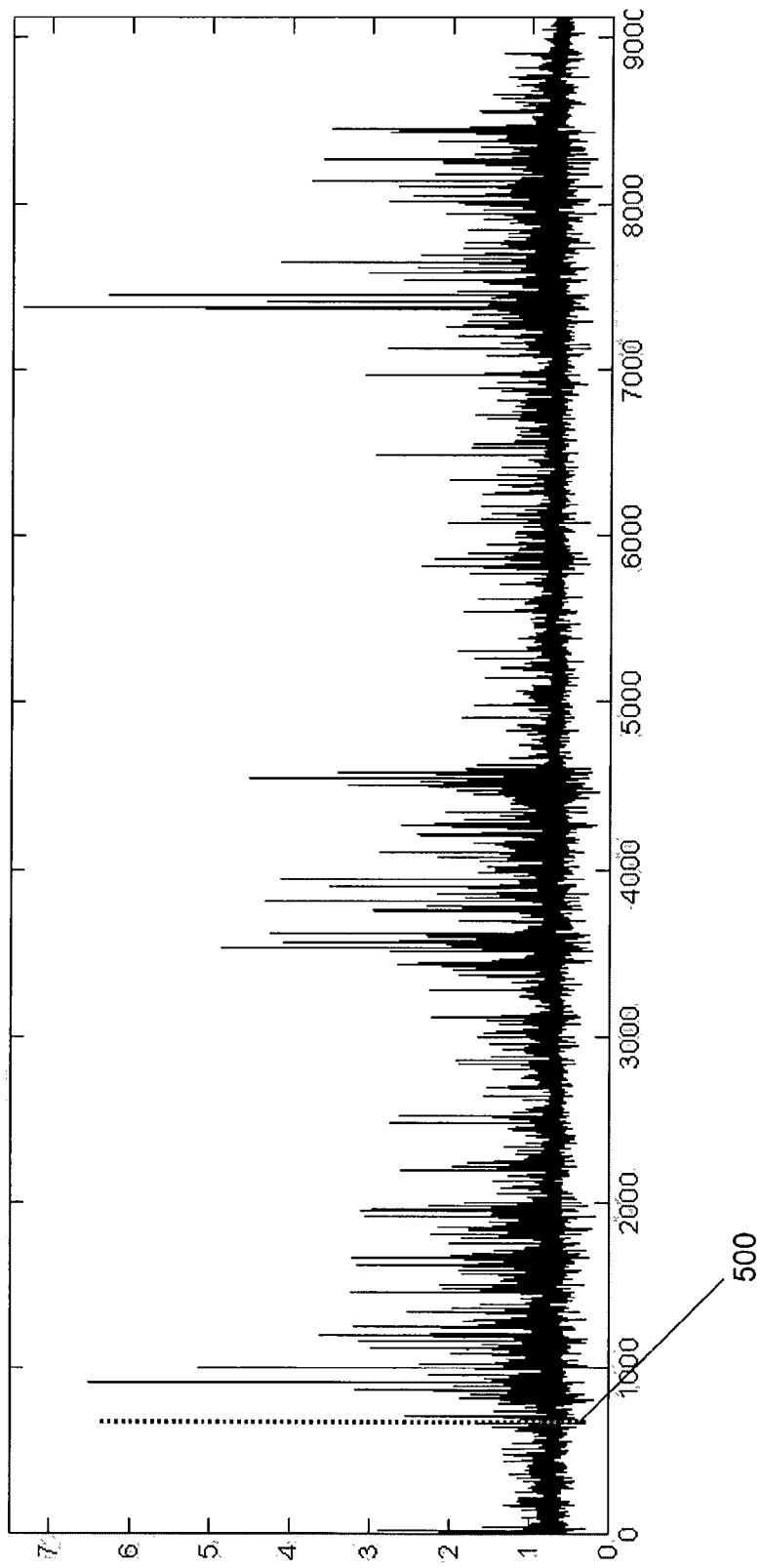
FIG. 5 shows a graph of spectral flux values of an audio track.

For example, $F_n$ can be computed every 20 ms. Within an audio track, the start of a singing voice can be indicated by the appearance of high peaks in the spectral flux value, since the human voice signal tends to have higher rate of change than instrumental music. An example is shown in FIG. 5, where the dotted line 500 denotes the start of singing voice on this graph of spectral flux values of an audio track.

Under the filter analysis method, a comb filter is applied to the audio track to detect differences between a singer's voice and the sounds of musical instruments. The output of the audio signal from the filter differs, based on whether the input signal is singing or instrumental sounds. By recognizing these differences, exemplary embodiments can identify where human singing starts on the audio track.

The short-time energy function of an audio signal is defined as $$E_n = \frac{1}{N}\sum_m [x(m)w(n-m)]^2$$ (4)

where $x(m)$ is the discrete time audio signal, m is time index of the audio sample, n is time index of the short-time energy, and $w(m)$ is a rectangle window, where $$w(m) = \begin{cases} 1 & 0 \le m \le N-1 \\ 0 & \text{otherwise} \end{cases}$$

Figure 6:
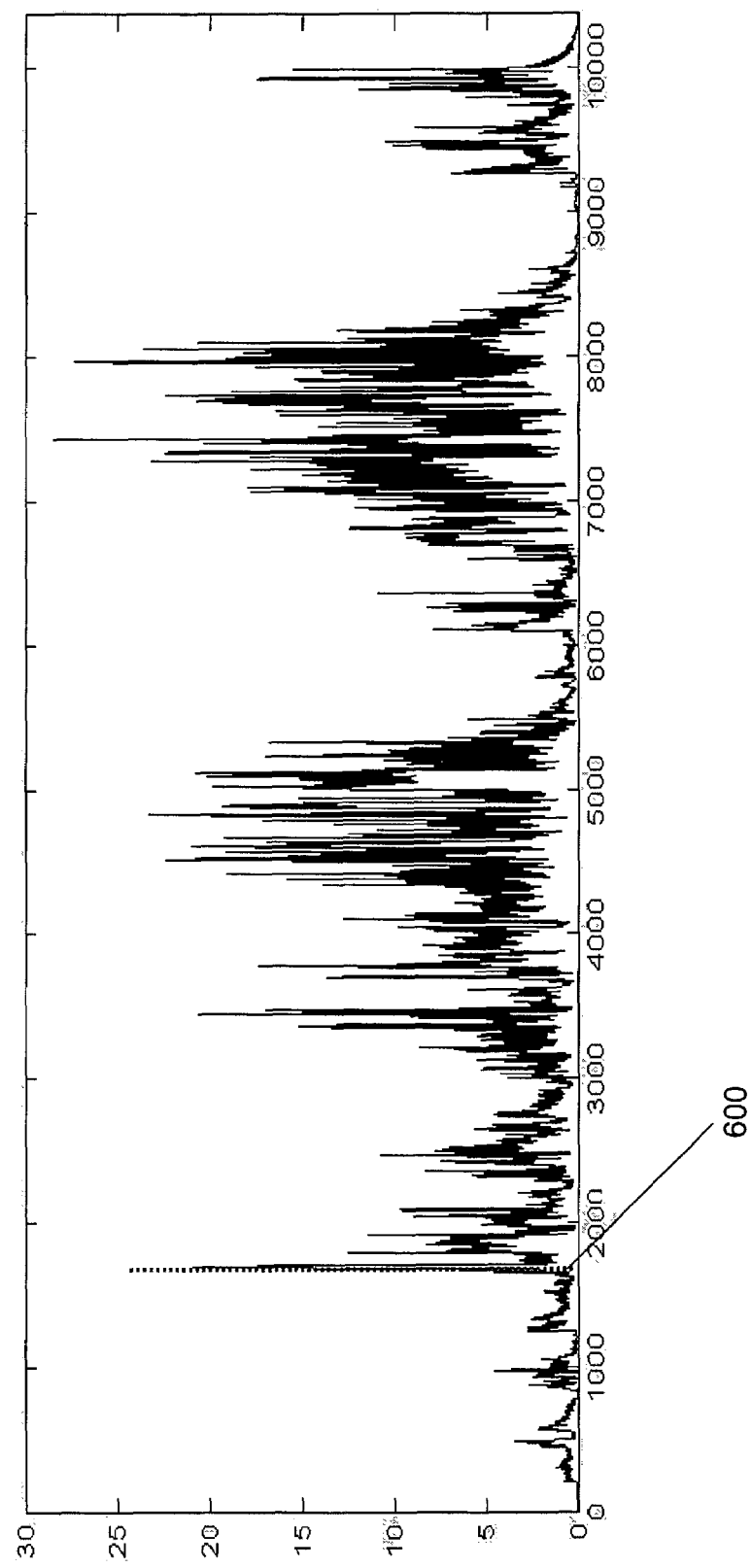
FIG. 6 shows a graph of short-time energy function values of an audio track.

N is length of the window $w(m)$. The short-time energy function provides a convenient representation of the amplitude variation of the audio signal over the time. Similar to the average zero-crossing rate, $E_n$ can also be computed every 10-20 ms, and the length of the window is set to be larger than the interval so that neighboring audio frames overlap each other. The start of a singing voice on an audio track can be viewed as a sudden rise in the energy level of the audio signal in a song. A typical example is illustrated in FIG. 6 where the short-time energy function values of a song are displayed, and the dotted line 600 indicates the start point of a singing voice. Also, the appearance of low level energy minimums after a relatively long period of continuous high energy values may also indicate the start of a singing voice. The short-term energy function and the short-time average zero-crossing rate are discussed in Lawrence R. Rabiner and Ronald W. Schafer, DIGITAL PROCESSING OF SPEECH SIGNALS, 120-131, (Prentice-Hall 1978), the contents of which are incorporated herein by reference.

By utilizing more than one of the above voice detection methods, exemplary embodiments can identify human sounds on the audio track even when the results of one detection method are inconclusive regarding the identification of human sounds on the audio track. For example, if the relative amplitudes of the ZCR rates between the music interlude and the singing portions of the audio track are similar in value, detection of the human portions of the audio track can be difficult or inconclusive. Upon failing to detect high ZCR amplitude peaks indicative of human voices, embodiments can then apply a different voice detection method, such as harmonic coefficient, to attempt to detect the occurrence of human sounds on the audio track.

Exemplary embodiments also permit detecting non-human sounds on the audio track as a first content feature or characteristic. In these embodiments, a user can select a particular sound or sounds, such as applause or the sound of a particular instrument, at step 202. In this manner, a particular sound, such as part of a purely instrumental audio track, can be selected and searched for as a characteristic representative of the audio track. Exemplary audio clips, statistical models, and/or parameters are stored on storage 114 and can be utilized by embodiments to compare against sounds and signals within the audio track for finding a match to a particular non-human sound or instrument, for example.

Referring back to FIGS. 1 and 2, following detection of a first content feature or characteristic within the audio track, a portion of the audio track is extracted at step 204 for subsequent storage in storage 122 to be used as all or part of a thumbnail of the audio track. The extracted portion begins or commences where the searched-for characteristic was first detected on the audio track. The length of the extracted portion is selected by the user but can default to, for example, ten seconds or any other specified time frame, if no selection of a first length parameter is made. Alternatively, the length of the portion to be extracted can be measured in musical terms such as five bars or one measure of music. As is known in the art, a note is a basic unit in a music score, with the note representing both pitch and duration information. One or more notes comprise a beat, and one or more beats comprise a bar, which represents a music segment in time. Exemplary embodiments can create a thumbnail measured in time in increments of chronological time or music segments.

Figure 8:
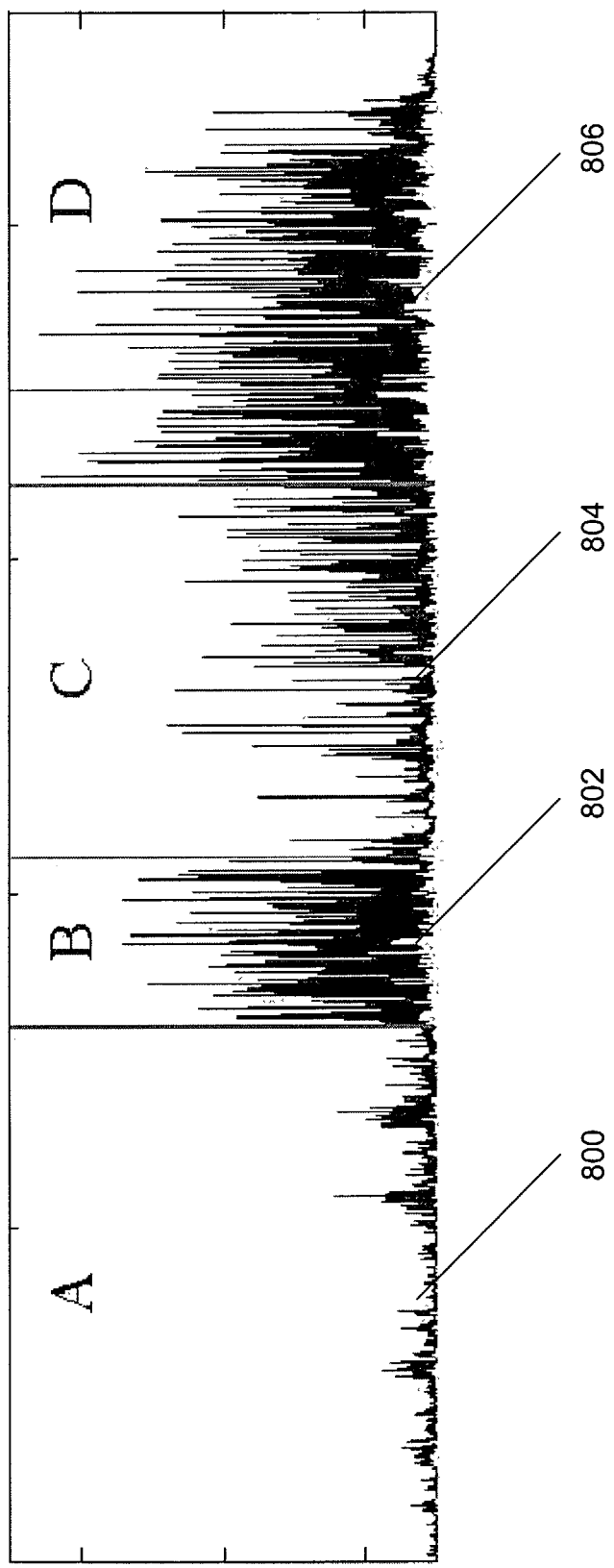
FIG. 8 shows the temporal energy envelope of a song.
Figure 9:
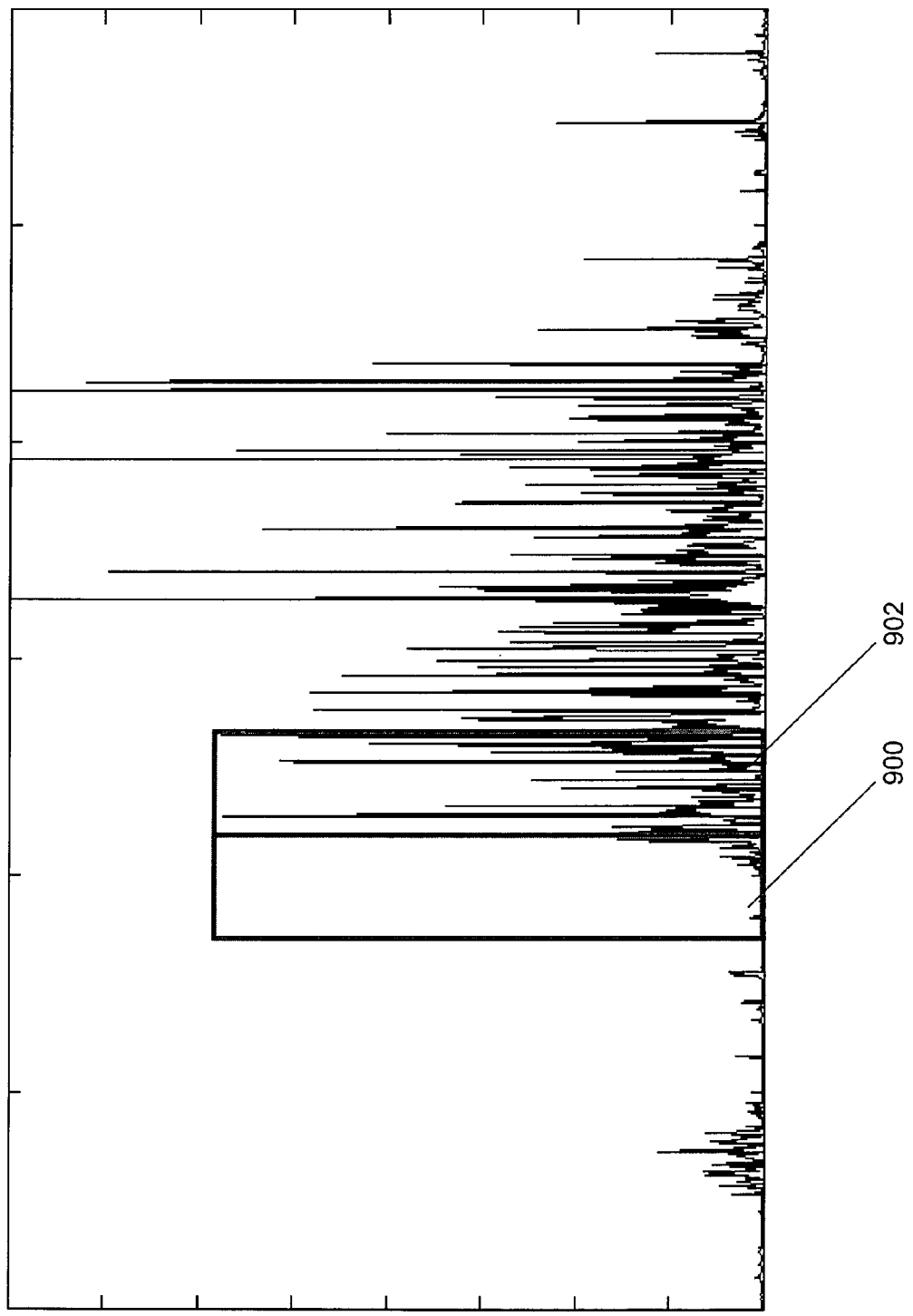
FIG. 9 shows temporal energy levels of audio signals on an audio track.

Referring now to FIGS. 1, 2, 7, 8, and 9, at step 206, the system detects the occurrence of a second characteristic within the audio track. In this step, exemplary embodiments are searching for and attempting to detect a highlight in the song that can be representative of the song. While the highlight can be a chorus or a refrain within the song, and thereby the audio track, exemplary embodiments search for an occurrence of a sudden increase in temporal energy on the audio track that corresponds to a human sound, such as a voice or singing. In this embodiment, the temporal energy envelope of the audio track is computed at step 700. An exemplary temporal energy envelope of a song is shown in FIG. 8, where the envelope has been divided into four parts as indicative of not only the energy of the song but also the content of the song. Part A at 800 includes an instrumental prelude and the first two paragraphs of singing. Singing of the main melody is represented in part B at 802. Part C at 804 consists of another interlude and another paragraph of singing. Part D at 806 shows the main melody being repeated twice. The singing of the main melody at 802 and 806 can be seen as having a higher energy, such as a higher volume of sound, than the normal paragraphs of singing as shown in 800 and 804. Two adjacent windows, 900 and 902 as shown in FIG. 9, are mapped onto the respective energy envelops of two segments of the audio track at step 702. The exemplary placement of window 900 on a first segment of the audio track and window 902 on a second segment in FIG. 9 happens to correspond to a sudden increase in temporal energy in window 902, as can be seen with the energy spike at the beginning of window 902 and which will be discussed in more detail below. However, the initial placement of the window 900 typically commences with the beginning of the audio track, with window 902 being located immediately to the right of window 900. The width of the windows is selected from control parameter storage 112, and the width of the two windows need not be equal. However, the width of each window can default to 10 ms, for example.

The audio track shown in FIG. 9 is expressed as an audio signal that is heard from left to right and is correspondingly processed by exemplary embodiments from left to right. If the audio data mapped to the rightmost window 902 is not human sound, as determined by one or more of the voice detection methods or any other human sound recognition means, the mapping of the windows onto the audio track is shifted to the right the length of the smaller of the two windows. If the audio data mapped to the rightmost window 902 is determined to be human sound, as in step 704, the temporal energy of the audio data on the segment of the audio track within the leftmost window 900 is compared at step 706 to the temporal energy of the audio data on the segment of the audio track within the rightmost window 902. If the comparison shows a sudden increase in temporal energy from the left window 900 to the right window 902 of audio data, the magnitude of the increase is compared to a predetermined threshold at step 708 as selected from control parameter storage 112 or as a default. If the compared increase in temporal energy exceeds the threshold, the compared increase and the location on the audio track corresponding to the beginning of the right window 902 are retained as indicative of a highlight on the audio track in memory on the computer 100 or on a storage device 114. The mapping of the windows on the audio track is then shifted to the right the width of the smaller window, and in this manner the entire length of the audio track is processed to determine, at step 710, the highest increase in temporal energy from window to window corresponding to a human sound. The location on the audio track corresponding to this largest increase in audio energy can be viewed as the most significant highlight on the audio track. Alternatively, each of the occurrences of an increase in temporal energy corresponding to a human sound and exceeding a predetermined threshold can be considered a highlight on the audio track.

At step 208, the portion of the audio track corresponding to the largest increase in temporal energy is extracted for subsequent storage in storage 122 as part of a thumbnail of the audio track. The portion to be extracted begins or commences on the audio track at the beginning, or left edge, of the window 902 that was mapped to the audio track when the respective temporal energies between the adjacent windows was compared at step 710 and subsequently determined to be the largest increase in temporal energy on the audio track. The length of the extracted portion is selected by the user but can default to ten seconds or the width of the right window 902 if no selection of a second length parameter is made. Alternatively, the length of the portion to be extracted can be measured in musical terms such as five bars or one measure of music. The first extracted portion of the audio track and the second extracted portion of the audio track are combined at step 210, and the resultant audio thumbnail is stored in storage 126 at step 212 for subsequent browsing to preview songs for playing, purchasing, or the like.

Some musical pieces can be relatively constant regarding the audio energy throughout the audio track. An analysis of the audio tracks corresponding to these musical works can fail to produce any occurrences of a significant increase in temporal energy from one window to the next along the audio track. In such an event, exemplary embodiments do not perform the extraction step 208 of a second portion of the audio track. Correspondingly, step 210 is skipped, and step 212 stores only the first portion of the audio track as corresponding to the occurrence of the first characteristic as the audio thumbnail of the audio track.

Figure 10:
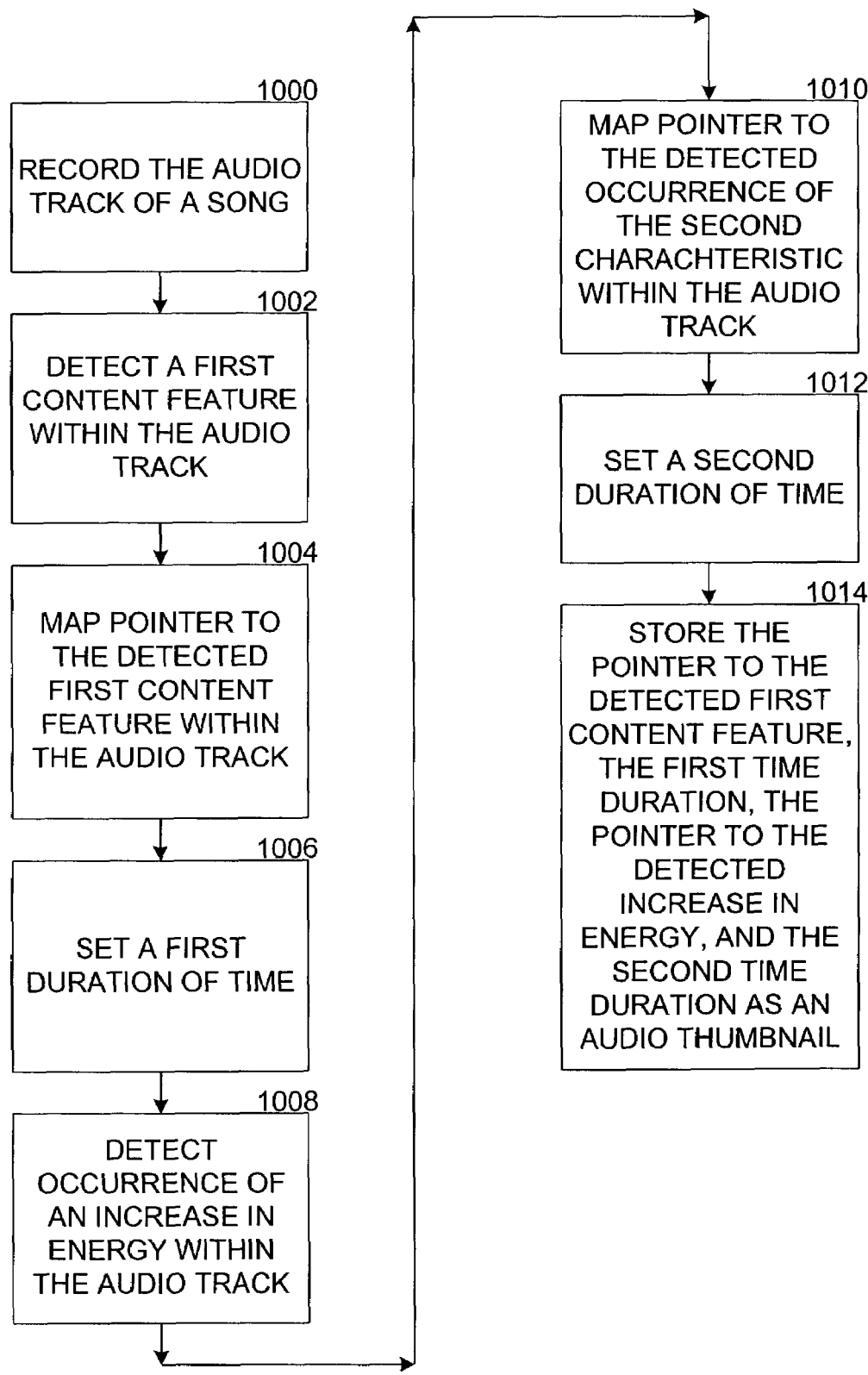
FIG. 10 shows a block flow chart of an alternative method for generating a thumbnail of an audio track.

An alternative embodiment is shown in FIG. 10 wherein pointers to the occurrences of characteristics on the audio track are mapped and stored instead of the corresponding portions of the audio track being extracted and stored as shown in FIG. 2. Steps 1000 and 1002 correspond to steps 200 and 202 in FIG. 2 and show the recording of an audio track and detecting the occurrence of a first content feature or characteristic within the audio track. At step 1004, a pointer is mapped to the location on the audio track where the first characteristic, such as the beginning of singing on the audio track, has been detected. The occurrence of an increase in energy within the audio track is detected at step 1008. Correspondingly, at step 1010, a second pointer is mapped to the location on the audio track where the occurrence of a highlight, such as the largest increase in temporal energy within the audio track, has been detected. At steps 1006 and 1012 first and second durations of time are set, either as a default 10 seconds, for example, or as selected by the user through the graphical user interface 116 and/or from control parameter storage 112, whether the duration is measured as a function of time or music. At step 1014, the audio thumbnail for the audio track is stored in storage 126 in the form of the pointer to the detected occurrence of the first characteristic on the audio track, the first time duration, the pointer to the detected occurrence of an increase in energy on the audio track, and the second time duration. The pointer to the occurrence of the first content feature or characteristic can be viewed as a first pointer, and the pointer to the occurrence of the increase in energy can be viewed as a second pointer. In this embodiment, the musical piece can be viewed by application of the respective first and second pointers and durations of time to respectively play the musical piece starting where the first pointer directs, for a first duration, and then starting where the second pointer directs, for a second duration. In such a manner, a excerpt of a song or other audio composition can be previewed for an ultimate listening or purchasing decision.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for generating an audio thumbnail of an audio track, comprising:
   detecting a first content feature within the audio track;
   extracting a first portion of the audio track corresponding to the detected first content feature;
   detecting an occurrence of an increase in energy within the audio track;
   extracting a second portion of the audio track corresponding to the detected increase in energy; and
   combining the extracted first and second portions of the audio track into the audio thumbnail of the audio track, wherein the audio track is a song and wherein the first content feature is the start of a human voice within the song.

2. The method according to claim 1, wherein the audio track comprises singing and instrumental music.

3. The method according to claim 1, further comprising:
   storing the audio thumbnail; and
   playing the stored audio thumbnail to preview the song.

4. The method according to claim 1, wherein detecting the first content feature includes application of at least one of voice detection methods of short-time average zero crossing rate, harmonic coefficient spectral flux, filter analysis, and short-time energy function.

5. The method according to claim 1, further comprising:
   selecting a first duration of time, wherein the first portion of the audio track has a duration corresponding to the first duration of time; and
   selecting a second duration of time, wherein the second portion of the audio track has a duration corresponding to the second duration of time.

6. The method according to claim 1, wherein the increase in energy exceeds a predetermined threshold.

7. The method according to claim 1, wherein detecting an occurrence of an increase in energy comprises comparing an increase in the temporal energy between two adjacent portions of the audio track with a predetermined threshold.

8. The method according to claim 7, wherein detecting the occurrence of the increase in energy comprises:
   computing a temporal energy envelope for the audio track;
   mapping two adjacent windows on the audio track;
   detecting locations on the audio track corresponding to human sound;
   for each detected location of human sound on the audio track, comparing the computed temporal energy of the window corresponding to the detected location of the human sound with the computed temporal energy of the prior adjacent window;
   determining the portions of the audio track whose temporal energy increase over the energy of the prior adjacent portion of the audio track exceeds the predetermined threshold; and
   selecting as the second portion of the audio track the determined portion of the audio track having the greatest increase in temporal energy.

9. The method according to claim 8, wherein the locations corresponding to human sound are detected by applying a zero crossing rate algorithm, and wherein if the application of the zero crossing rate algorithm produces inconclusive results, applying one or more of a harmonic coefficient algorithm, a spectral flux algorithm, an energy function algorithm, or a filter analysis algorithm.

10. The method according to claim 1, wherein
   detecting the first content feature within the audio track detects first occurrence of singing on the audio track;
   extracting the first portion of the audio track corresponding to the detected first content feature extracts a predetermined portion of the audio track corresponding to the start of the detected first occurrence of singing;
   detecting the occurrence of an increase in energy within the audio track detects a second occurrence of human sound on the audio track as characterized by a greatest increase in temporal energy within human sound portions on the audio track;
   extracting the second portion of the audio track corresponding to the detected increase in energy extracts a predetermined portion of the audio track corresponding to the start of the detected second occurrence of human sound; and
   combining the enacted first and second portions of the audio track into the audio thumbnail of the audio track combines the extracted first occurrence of singing and second occurrence of human sound as the audio thumbnail of the song on the audio track.

11. A method for generating an audio thumbnail of an audio track, comprising:
   detecting a first content feature within the audio track;
   mapping a pointer to the detected first content feature within the audio track;
   setting a first duration of time;
   detecting an occurrence of an increase in energy within the audio track;
   mapping a pointer to the detected occurrence of an increase in energy within the audio track;
   setting a second duration of time; and
   storing the pointer to the detected first content feature, the first duration of time, the pointer to the detected occurrence of an increase in energy, and the second duration of time as the audio thumbnail of the audio track, wherein the audio track is a song and wherein the first content feature is the start of a human voice within the song.

12. A method of identifying a representative excerpt of a song, comprising:
   processing the song to detect a target point in the song that is at least one of (1) a start of singing within the song and (2) a point at which occurs a sudden increase in temporal energy within the song, with a portion of the song immediately following the sudden increase corresponding to singing;
   designating the representative excerpt for the song by defining a starting point for the representative excerpt based on the target point wherein the representative excerpt includes two portions, a first portion having a first starting point based on the start of singing within the song and a second portion having a second starting point based on the point at which occurs the sudden increase in temporal energy within the song; and storing at least one of the representative excerpt and a pointer to the representative excerpt, together with information for corresponding other representative excerpts of other songs, to facilitate efficient user browsing of the representative excerpt and said other representative excerpts.

13. A method of identifying a representative excerpt of a song, comprising:

processing the song to detect a target point in the song that is at least one of (1) a start of singing within the song and (2) a point at which occurs a sudden increase in temporal energy within the song, with a portion of the song immediately following the sudden increase corresponding to singing;

designating the representative excerpt for the song by defining a starting point for the representative excerpt based on the target point wherein the representative excerpt includes a portion having a first starting point based on the point at which occurs the sudden increase in temporal energy within the song, wherein the point at which occurs the sudden increase in temporal energy within the song corresponds to a greatest increase in temporal energy in the song where the portion of the song immediately following the increase corresponds to singing; and storing at least one of the representative excerpt and a pointer to the representative excerpt, together with information for corresponding other representative excerpts of other songs, to facilitate efficient user browsing the representative excerpt and said other representative excerpts.

14. A computer-readable medium encoded with computer executable instructions for identifying a representative excerpt of a song, said computer executable instructions comprising:

processing the song to detect a target point in the song that is at least one of (1) a start of singing within the song and (2) a point at which occurs a sudden increase in temporal energy within the song, with a portion of the song immediately following the sudden increase corresponding to singing;

designating the representative excerpt for the song by defining a starting point for the representative excerpt based on the target point wherein the representative excerpt includes two portions, a first portion having a first starting point based on the start of singing within the song and a second portion having a second starting point based on the point at which occurs the sudden increase in temporal energy within the song; and storing at least one of the representative excerpt and a pointer to the representative excerpt, together with information for corresponding other representative excerpts of other songs, to facilitate efficient user browsing of the representative excerpt and said other representative excerpts.

15. A computer-readable medium encoded with computer executable instructions for identifying a representative excerpt of a song, said computer executable instructions comprising:

processing the song to detect a target point in the song that is at least one of (1) a start of singing within the song and (2) a point at which occurs a sudden increase in temporal energy within the song, with a portion of the song immediately following the sudden increase corresponding to singing;

designating the representative excerpt for the song by defining a starting point for the representative excerpt based on the target point wherein the representative excerpt includes a portion having a first starting point based on the point at which occurs the sudden increase in temporal energy within the song, wherein the point at which occurs the sudden increase in temporal energy within the song corresponds to a greatest increase in temporal energy in the song where the portion of the song immediately following the increase corresponds to singing; and storing at least one of the representative excerpt and a pointer to the representative excerpt, together with information for corresponding other representative excerpts of other songs, to facilitate efficient user browsing of the representative excerpt and said other representative excerpts.

16. A computer-readable medium encoded with computer executable instructions for generating an audio thumbnail of an audio track, said computer executable instructions comprising:

detecting a first content feature within the audio track;

extracting a first portion of the audio track corresponding to the detected first content feature;

detecting an occurrence of an increase in energy within the audio track;

extracting a second portion of the audio track corresponding to the detected increase in energy; and combining the extracted first and second portions of the audio track into the audio thumbnail of the audio track, wherein the audio track is a song and wherein the first content feature is the start of a human voice within the song.

17. A computer-readable medium according to claim 16, wherein detecting an occurrence of an increase in energy comprises comparing an increase in the temporal energy between two adjacent portions of the audio track with a predetermined threshold.

* * * * *

UNITED STATES PATENT AND TRADEMARK OFFICE
CERTIFICATE OF CORRECTION

PATENT NO. : 7,386,357 B2 Page 1 of 1
APPLICATION NO. : 10/259572
DATED : June 10, 2008
INVENTOR(S) : Tong Zhang It is certified that error appears in the above-identified patent and that said Letters Patent is hereby corrected as shown below:

In column 11, line 40, in Claim 4, after "coefficient" insert -- , --.

In column 12, line 32, in Claim 10, delete "enacted" and insert -- extracted --, therefor.

In column 13, line 18, in Claim 13, delete "excrept" and insert -- excerpt --, therefor.

In column 13, line 33, in Claim 13, after "browsing" insert -- of --.

Signed and Sealed this

Thirteenth Day of January, 2009

JON W. DUDAS
*Director of the United States Patent and Trademark Office*